(12) United States Patent
Choi et al.

(10) Patent No.: US 12,522,160 B2
(45) Date of Patent: Jan. 13, 2026

(54) VEHICLE NETWORK SYSTEM AND RESET CONTROL METHOD THEREIN

(71) Applicant: Hyundai AutoEver Corp., Seoul (KR)

(72) Inventors: Sung Jin Choi, Seoul (KR); Keon Woo Lee, Seoul (KR); Seung Ho Lee, Seoul (KR); Ye Ji Park, Seoul (KR)

(73) Assignee: Hyundai AutoEver Corp., Seoul (KR)

( * ) Notice: Subject to any disclaimer, the term of this patent is extended or adjusted under 35 U.S.C. 154(b) by 172 days.

(21) Appl. No.: 18/391,095

(22) Filed: Dec. 20, 2023

(65) Prior Publication Data

US 2024/0208438 A1  Jun. 27, 2024

(30) Foreign Application Priority Data

Dec. 21, 2022  (KR) .................. 10-2022-0180847

(51) Int. Cl.
 *B60R 16/02* (2006.01)
 *B60R 16/023* (2006.01)
 *G07C 5/08* (2006.01)

(52) U.S. Cl.
 CPC ........ *B60R 16/0231* (2013.01); *G07C 5/0808* (2013.01)

(58) Field of Classification Search
 CPC ... B60R 16/0231; G07C 5/0808; H04W 8/30; H04W 4/48; H04W 8/245; H04L 12/40; H04L 2012/40273
 See application file for complete search history.

(56) References Cited

U.S. PATENT DOCUMENTS

2015/0258999 A1\* 9/2015 Jiang ..................... H04L 12/40
701/29.2

FOREIGN PATENT DOCUMENTS

| KR | 10-0977314 B1 | 8/2010 |
|----|---------------|--------|
| KR | 10-2019-0029995 A | 3/2019 |
| KR | 10-2360725 B1 | 2/2022 |

\* cited by examiner

*Primary Examiner* — Michael V Kerrigan
(74) *Attorney, Agent, or Firm* — Bridgeway IP Law Group, PLLC; Jihun Kim

(57) ABSTRACT

A vehicle network system includes a plurality of electronic control units (ECUs) which performs a scheduled task, wherein when an error occurs in any one ECU of the plurality of ECUs, the ECU is reset and the ECU after being reset respawns the task according to a performance period of a task to be performed.

16 Claims, 4 Drawing Sheets

VEHICLE NETWORK SYSTEM AND RESET CONTROL METHOD THEREIN

CROSS-REFERENCE TO RELATED APPLICATIONS

This application claims priority to and the benefit of Korean Patent Application No. 10-2022-0180847 filed in the Korean Intellectual Property Office on Dec. 21, 2022, the entire contents of which are incorporated herein by reference.

TECHNICAL FIELD

The present invention relates to a vehicle network system and a reset control method therein, and more particularly, to a vehicle network system including a plurality of ECUs which performs a scheduled task and a reset control method therein.

BACKGROUND ART

Recently, in the vehicle, various types of electronic systems are mounted and a plurality of electronic control units (ECU) for controlling the electronic systems has been mounted. The plurality of ECUs is connected to each other through a network of the vehicle and shares the information to perform various functions of the vehicle.

In such a vehicle network system, the plurality of ECUs performs a scheduled task and in particular, when an error occurs in a specific ECU, the task scheduling is agley to cause continuous erroneous operation. In this case, all the ECUs need to be reset to start the scheduled tasks again from the beginning. To this end, in the related art, when the ECU in which an error occurs reports the occurrence of the error to the micro controller unit MCU, the MCU resets the ECUs which perform the scheduled task.

However, in some cases, a task of the ECU in which an error occurs does not affect the task of the other ECUs. Also in this case, it is inefficient to reset all the ECUs.

SUMMARY OF THE INVENTION

An object to be achieved by the present invention is to provide a vehicle network system which resets only an ECU in which an error occurs when a task of the ECU in which an error occurs, among a plurality of ECUs which performs a scheduled task, does not affect tasks of the other ECUs and re-performs the corresponding task and a reset control method therein.

The technical object to be achieved by the present invention is not limited to the above-mentioned technical objects, and other technical objects, which are not mentioned above, can be clearly understood by those skilled in the art from the following descriptions.

In order to achieve the above-described technical objects, according to an aspect of the present invention, a vehicle network system includes a plurality of electronic control units (ECU) which performs a scheduled task, when an error occurs in at least one ECU of the plurality of ECUs, the ECU in which the error occurs is reset and after resetting, the ECU in which the error occurs respawns an interrupted task according to a performance period of a task (interrupted task) which is performed in the ECU in which the error occurs.

The at least one ECU updates a last launch time of the scheduled task whenever the scheduled task is performed.

The ECU in which the error occurs respawns the interrupted task at a time of a multiple of the performance period from the last launch time.

The at least one ECU includes a platform health management (PHM) module, a time synchronization (TS) module, and an execution management (EM) module, the TS module updates a last launch time of the scheduled task, the PHM module resets the ECU in which the error occurs, and the EM module respawns the interrupted task.

The at least one ECU further includes a watchdog timer which resets the ECU when a watchdog trigger signal is not received from the PHM module, and the PHM module stops the transmission of the watchdog trigger signal to reset the ECU.

The EM module acquires a last launch time $L_t$ of the interrupted task and acquires a current time T and respawns the interrupted task at a time of a multiple of the performance period from the last launch time, using the current time T, the last launch time $L_t$, and the performance period $p_{t\_id}$.

The EM module finds out a minimum value $k_{min}$ of a natural number k satisfying $T<L_t+k*p_{t\_id}$ and respawns the interrupted task at time $L_t+k_{min}*p_{t\_id}$.

In one exemplary embodiment, the interrupted task to respawn does not affect a task of other ECUs other than the ECU in which the error occurs.

In order to achieve the above-described technical objects, according to an aspect of the present invention, a reset control method in a vehicle network system which includes a plurality of electronic control units (ECU) which performs a scheduled task, includes: a step of resetting an ECU in which the error occurs when an error occurs in at least one ECU of the plurality of ECUs; and a step of respawning an interrupted task according to a performance period of a task (interrupted task) which is performed, after resetting, by the ECU in which the error occurs.

The at least one ECU updates a last launch time of the scheduled task whenever the scheduled task is performed.

In the step of respawning the interrupted task, the interrupted task is respawned at a time of a multiple of the performance period from the last launch time.

The at least one ECU includes a platform health management (PHM) module, a time synchronization (TS) module, and an execution management (EM) module, in the step of updating, the TS module updates a last launch time of the scheduled task, in the step of resetting, the PHM module resets the ECU in which an error occurs, and in the step of respawning an interrupted task, the EM module respawns the interrupted task.

The at least one ECU further includes a watchdog timer which resets the ECU when a watchdog trigger signal is not received from the PHM module, and in the step of resetting, the PHM module stops the transmission of the watchdog trigger signal to reset the ECU.

The step of respawning an interrupted task includes a step of acquiring a last launch time $L_t$ of the interrupted task and acquiring a current time T; and a step of respawning the interrupted task at a time of a multiple of the performance period from the last launch time, using the current time T, the last launch time $L_t$, and the performance period $p_{t\_id}$.

In the step of respawning an interrupted task, a minimum value $k_{min}$ of a natural number k satisfying $T<L_t+k*p_{t\_id}$ is found out and the interrupted task at time $L_t+k_{min}*p_{t\_id}$ is respawned.

According to the present invention, a task of an ECU in which an error occurs, among the plurality of ECUs which performs the scheduled tasks, does not affect the task of the other ECUs, only the ECU in which an error occurs is reset and the corresponding task respawns. Accordingly, a configuration of the vehicle network system is simplified and a system efficiency is improved.

Effects of the present invention are not limited to the above-mentioned effects, and other effects, which are not mentioned above, can be clearly understood by those skilled in the art from the following descriptions.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
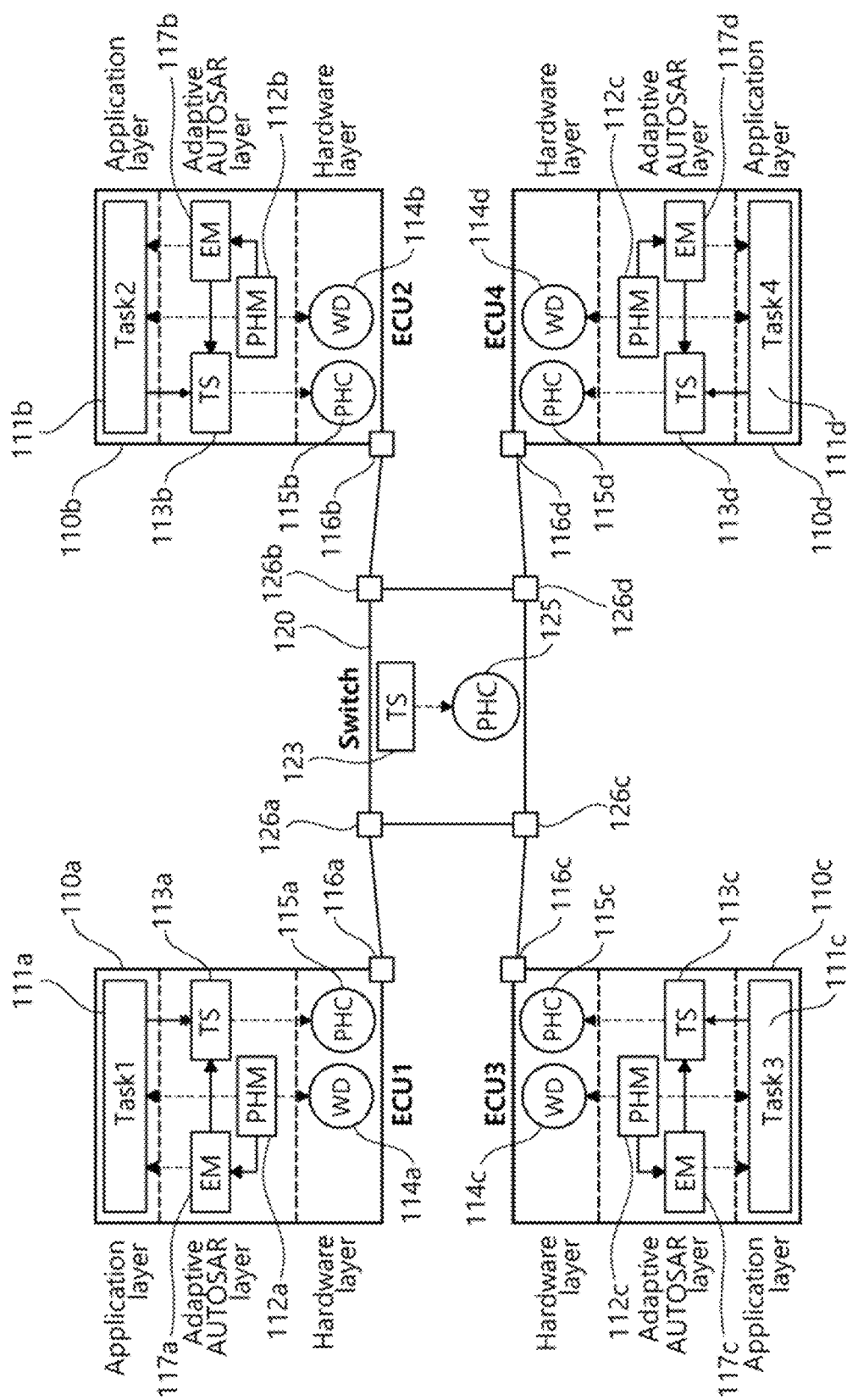
FIG. 1 illustrates a configuration of a vehicle network system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. Substantially same components in the following description and the accompanying drawings may be denoted by the same reference numerals and redundant description will be omitted. Further, in the description of the exemplary embodiment, if it is considered that specific description of related known configuration or function may cloud the gist of the present invention, the detailed description thereof will be omitted.

FIG. 1 illustrates a configuration of a vehicle network system according to an exemplary embodiment of the present invention.

Referring to FIG. 1, a vehicle network system according to the exemplary embodiment includes first to fourth ECUs 110a, 110b, 110c, and 110d and an Ethernet switch 120. In the present exemplary embodiment, for the convenience of description, four ECUs will be described, but the number of ECUs may be an arbitrary number of 2 or larger. Hereinafter, an ECU 100 may refer to an arbitrary ECU among first to fourth ECUs 110a, 110b, 110c, and 110d.

The first to fourth ECUs 110a, 110b, 110c, and 110d each have an application layer, adaptive AUTOSAR layer, and a hardware layer.

In the application layers of the first to fourth ECUs 110a, 110b, 110c, and 110d, first to fourth tasks 111a, 111b, 111c, and 111d may be performed by each application. The first to fourth tasks 111a, 111b, 111c, and 111d are scheduled to be operated.

The first to fourth ECUs 110a, 110b, 110c, and 11d include a platform health management (PHM) module 112a, 112b, 112c, 112d, time synchronization (TS) modules 113a, 113b, 113c, and 113d, and execution management (EM) modules 117a, 117b, 117c, and 117d, respectively, in the adaptive AUTOSAR layer and include watchdog modules 114a, 114b, 114c, and 114d, PTP hardware clock (PHC) modules 115a, 115b, 115c, and 115d, and Ethernet ports 116a, 116b, 116c, and 116d in the hardware layer.

The Ethernet switch 120 includes a TS module 123, a PHC module 125, and Ethernet ports 126a, 126b, 126c, and 126d.

In the following description, the PHM module 112 may refer to an arbitrary PHM module among the PHM modules 112a, 112b, 112c, and 112d. Further, the TS module 113 may refer to an arbitrary TS module among the TS modules 113a, 113b, 113c, and 113d. Further, the EM module 117 may refer to an arbitrary EM module among the EM modules 117a, 117b, 117c, and 117d. Further, the watchdog module 114 may refer to an arbitrary watchdog module among the watchdog modules 114a, 114b, 114c, and 114d. Further, the PHC module 115 may refer to an arbitrary PHC module among the PHC modules 115a, 115b, 115c, and 115d. Further, the Ethernet port 116 may refer to an arbitrary Ethernet port among the Ethernet ports 116a, 116b, 116c, and 116d.

The ECU 100 may transmit and receive data with the other ECUs through the Ethernet port 116 and the Ethernet switch 120.

The PHM module 112 is a module provided from the adaptive AUTOSAR and performs a function of supervising a health status of an application. The PHM module 112 transmits a watchdog trigger signal to the watchdog module 114 in a normal status and resets the node by stopping the transmission of the watchdog trigger signal.

The TS module 113 is a module provided from the adaptive AUTOSAR and synchronizes PHC modules in the nodes in the network by transmitting and receiving a gPTP (network-time synchronization protocol) packet to allow all the nodes in the network to use the same time zone. Alternatively, the TS module 113 divides the network for every domain to use different time zones for every domain.

The EM module 117 supports execution and termination of an application. When the application is executed, data initialization is supported and when the application is terminated, data storing and resource release are supported.

The watchdog module 114 senses a watchdog trigger signal received from the PHM module 112 and resets the corresponding node when the watchdog trigger signal is not received.

The PHC module 115 performs a function of synchronizing a time in the network.

Figure 2:
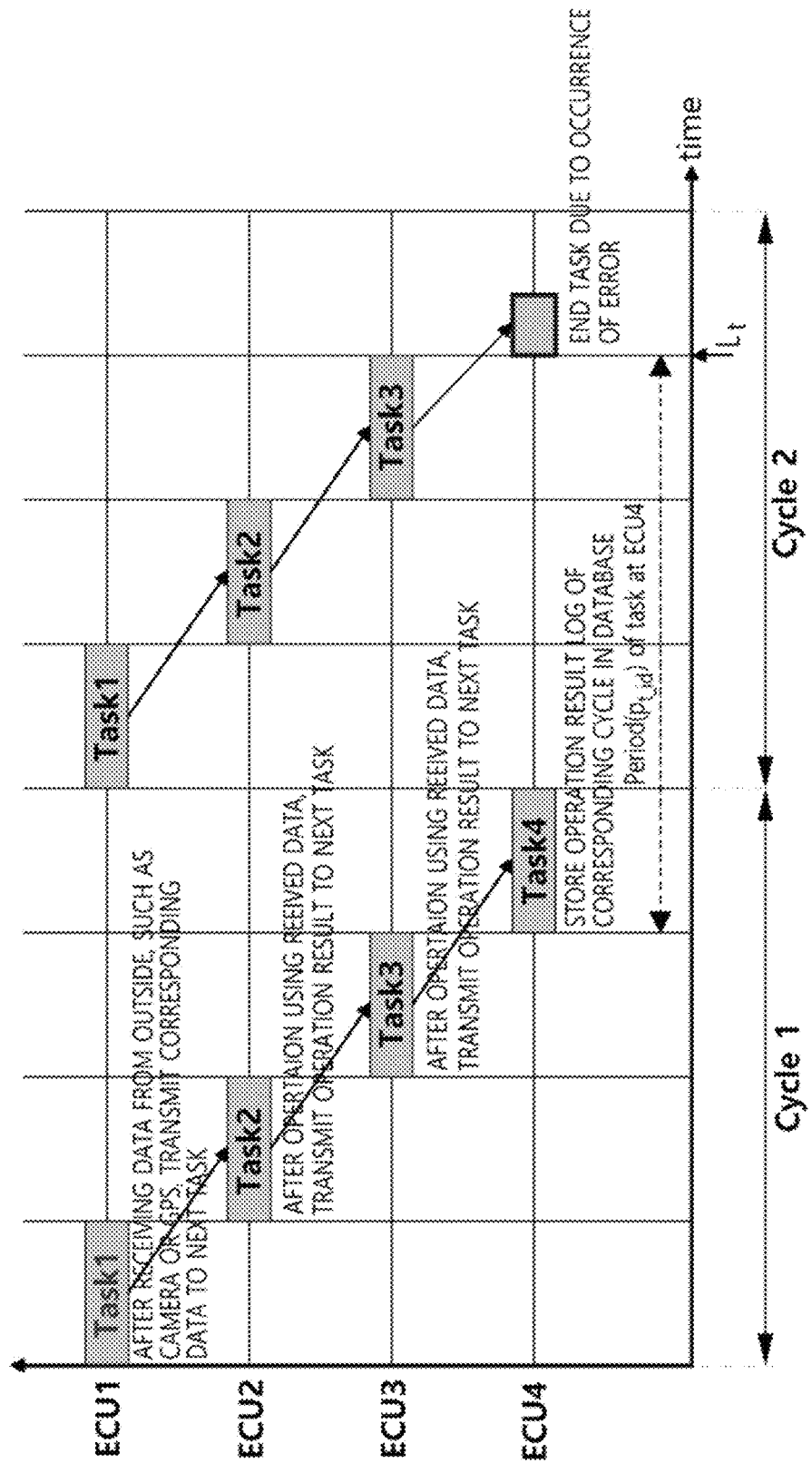
FIG. 2 illustrates an example of resetting only the corresponding ECU and respawning the task when an error occurs in a specific ECU of a vehicle network system.

FIG. 2 illustrates an example of resetting only an ECU in which an error occurs and respawning the task when an error occurs in a specific ECU of a vehicle network system.

Referring to FIG. 2, a first task 111a (Task1) of the first ECU 110a receives data from the outside, such as a camera or a GPS and then transmits the corresponding data to the second task 111b (Task2) of the second ECU 110b. A second task 111b (Task2) of the second ECU 110b operates using the received data and then transmits the operation result to the third task 111c (Task3) of the third ECU 110c. A third task 111c (Task3) of the third ECU 110c operates using the received data and then transmits the operation result to the fourth task 111d (Task4) of the fourth ECU 110d. A fourth task 111d (Task4) of the fourth ECU 110d stores an operation result log of the corresponding cycle in an internal database.

As described above, when the first to fourth tasks 111a, 111b, 111c, and 111d are scheduled to operate in the first to fourth ECUs 110a, 110b, 110c, and 110d, an error occurs in the fourth task 111d (Task4) of the fourth ECU 110d so that the fourth task 111d (Task4) may be terminated (in this specification, a task which is terminated due to the occurrence of the error is referred to as an "interrupted task"). In this case, may all recovery actions of the fourth task 111d (Task4) fail due to an error of unknown cause occurring within the fourth ECU 110d. The fourth task 111d (Task4) of the fourth ECU 110d is a simple logging operation and the error does not affect the actual operation of the vehicle. Accordingly, there is no need to reset all the ECUs and only the fourth ECU 110d is reset while maintaining operations of the other ECUs 111a, 111b, and 111c and in a next cycle, the fourth task 111d respawns.

In the exemplary embodiment of the present invention, a new function API is added to the PHM module 112, the TS module 113, and the EM module 117 to reset only the ECU in which an error occurs, among the ECUs which perform the scheduled task in the vehicle network system and the task respawns according to a performance period of task performed in the ECU.

Figure 3:
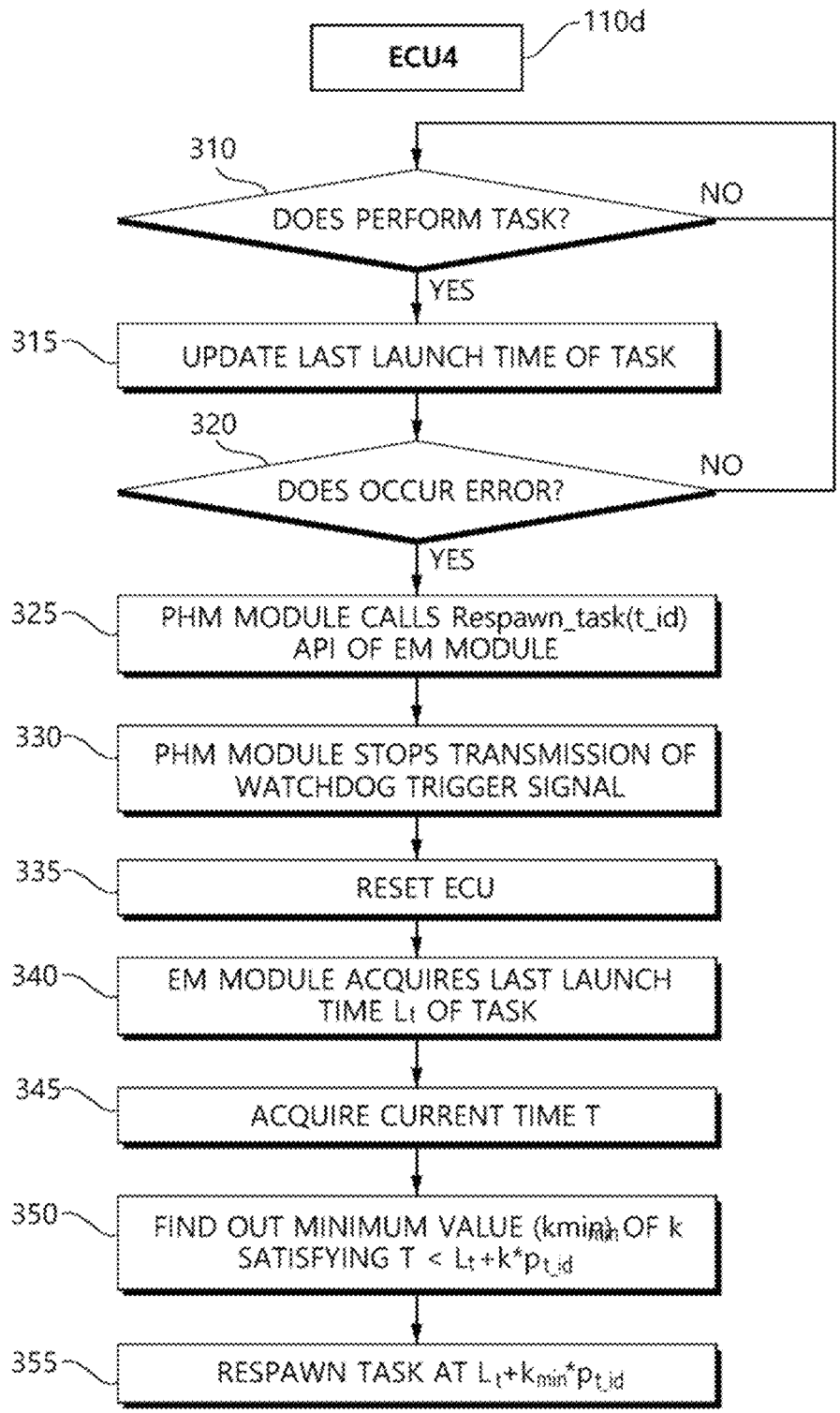
FIG. 3 illustrates a flowchart of a reset control method according to an exemplary embodiment of the present invention.

FIG. 3 illustrates a flowchart of a reset control method according to an exemplary embodiment of the present invention.

In the exemplary embodiment of the present invention, in the TS module 113, a function of updating a last launch time of the task in a non-volatile memory whenever the task is performed, UpdateLaunchedTime API is added. Further, in the EM module 117, a GetLastLaunchedTime API which is a function of acquiring a last launch time of the task and a Respawn_task API which is a function of respawning a task at a specific time are added. The PHM module 112 calls the Respawn_task API of the EM module 117 before resetting the node. In the meantime, a task performance period $p_{t\_id}$ (here, t_id indicates a task indicator of the task) is registered in the EM module 117 by means of a process of configuring an EM module 117. Referring to FIG. 2, a task performance period $p_{t\_id}$ of the fourth task 111d of the fourth ECU 110d is illustrated.

A reset control method according to the present exemplary embodiment is performed in the fourth ECU 110d.

In step 310, whenever a task is performed, in step 315, the TS module 113d performs UpdateLaunchedTime(t_id) API to update a last launch time of the task in the non-volatile memory.

In step 320, the PHM module 112d senses that an error occurs in the fourth task 111d.

When the occurrence of error is sensed, in step 325, the PHM module 112d calls Respawn_task(t_id) API of the EM module 117d.

In step 330, the PHM module 112d stops transmission of a watchdog trigger signal to the watchdog module 114d.

When the watchdog trigger signal is not received by stopping the transmission of the watchdog trigger signal, in step 335, the watchdog module 114d resets the fourth ECU 110d so that the fourth ECU 110d is reset.

When the fourth ECU 110d is reset, in step 340, the EM module 117d performs GetLastLaunchedTime((t_id) API to acquire a last launch time $L_t$ of the corresponding task. Referring to FIG. 2, the last launch time $L_t$ of the fourth task 111d is illustrated.

In step 345, the EM module 117d obtains a current time T of the PHC module 115d using a now( ) API provided by the TS module 113d.

In step 350, the EM module 117d finds out a minimum value $k_{min}$ of a natural number k satisfying $T<L_t+k*p_{t\_id}$.

In step 360, the EM module 117d respawns the task at $L_t+k_{min}*p_{t\_id}$.

Accordingly, according to the exemplary embodiment of the present invention, the fourth ECU 110d respawns the task at $L_t+k_{min}*p_{t\_id}$ which is a time of multiple of the task performance period $(p_{t\_id})$ from the last launch time $(L_t)$ of the task.

Figure 4:
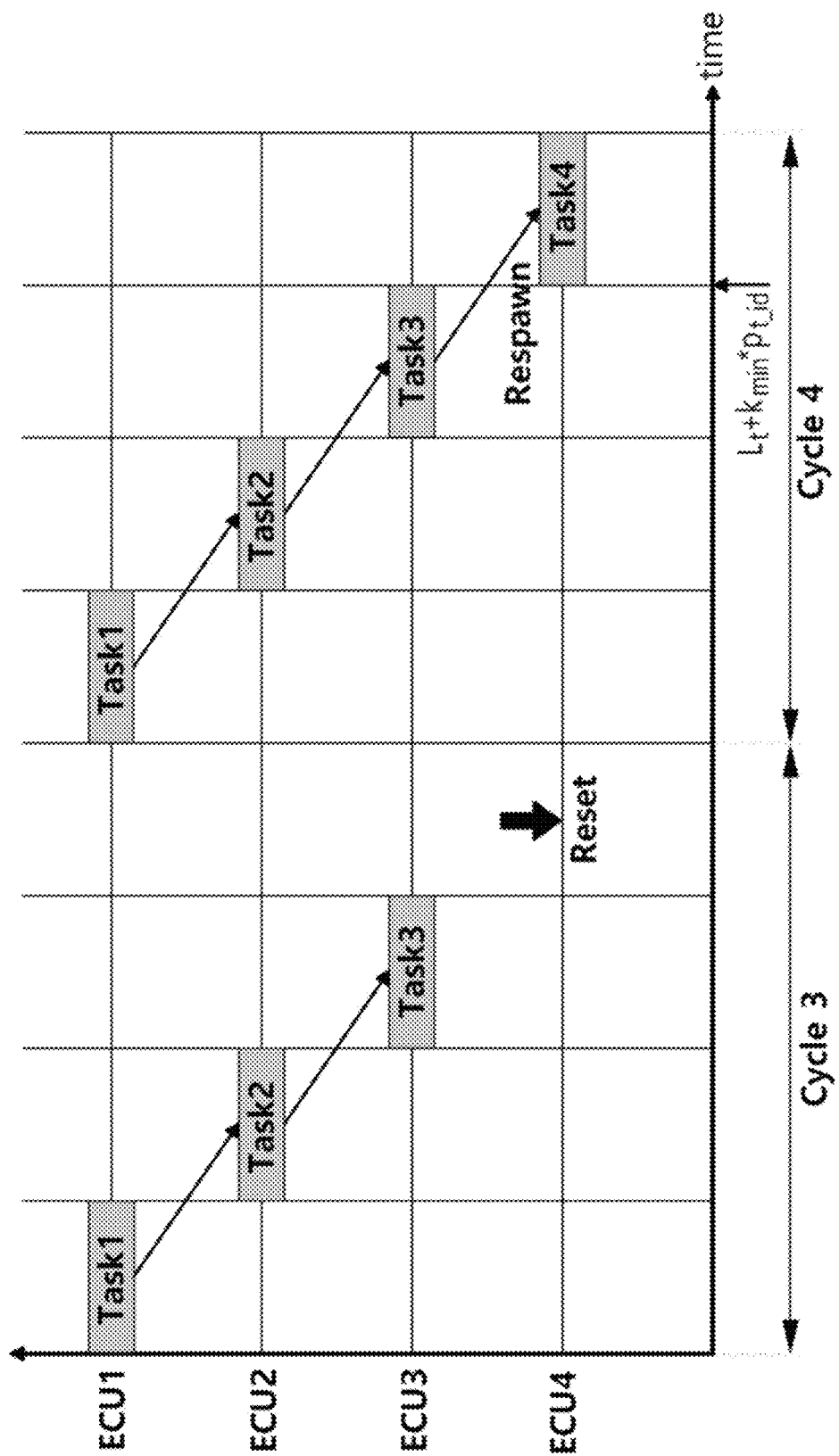
FIG. 4 illustrates an example of resetting an ECU in which an error occurs and respawning a task, according to an exemplary embodiment of the present invention.

FIG. 4 illustrates an example that after resetting the fourth ECU 110d, the fourth task 111d is respawned in the fourth ECU 110d, according to the exemplary embodiment of the present invention. Referring to FIGS. 2 and 4, it is illustrated that in a cycle 2, an error occurs in the fourth task 111d of the fourth ECU 110d, at a cycle 3, the fourth ECU 110d is reset, and then at a cycle 4, the fourth task 111d is respawned at a time $L_t+k_{min}*p_{t\_id}$ of a multiple of a performance period $p_{t\_id}$ from the last launch time $L_t$ of the fourth task 111d.

The combinations of blocks of the block diagrams and steps in the flowcharts of the present invention may be implemented by computer program instructions. The computer program instructions may be loaded in a processor of a general purpose computer, a special purpose computer, or other programmable data processing apparatus, so that the instructions executed via the processor of the computer or other programmable data processing apparatus create means for implementing the functions described in the blocks of the block diagrams or the steps in the flowcharts. These computer program instructions may also be stored in a computer-usable or computer readable memory that may direct a computer or other programmable data processing apparatus to implement function in a particular manner, so that the instructions stored in the computer usable or computer readable memory produce a manufacturing article including instruction means which implement the function described in the blocks of the block diagrams or the steps in the flowcharts. The computer program instructions may be loaded onto a computer or other programmable data processing apparatus to cause a series of operational steps to be performed on the computer or other programmable data processing apparatus to produce a computer implemented process such that the instructions executed on the computer or other programmable data processing apparatus provide steps for implementing the functions described in the blocks of the block diagrams or the steps in the flowcharts.

Each block or each step may represent a part of a module, a segment or a code, including one or more executable instructions for executing specific logical function(s). In addition, it should be noted that the functions mentioned in the blocks or steps may occur out of order in several alternative embodiments. For example, two blocks or steps shown in succession may be executed substantially concurrently, or blocks or steps sometimes may be executed in reverse order according to corresponding functions.

It will be appreciated that various exemplary embodiments of the present invention have been described herein for purposes of illustration, and that various modifications, changes, and substitutions may be made by those skilled in the art without departing from the scope and spirit of the present invention. Therefore, the exemplary embodiments of the present invention are provided for illustrative purposes only but not intended to limit the technical concept of the present invention. The scope of the technical concept of the present invention is not limited thereto. The protection scope of the present invention should be interpreted based on the following appended claims and it should be appreciated that all technical spirits included within a range equivalent thereto are included in the protection scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle network system comprising:
   a plurality of electronic control units (ECUs) configured to perform a scheduled task,
   wherein when an error occurs in at least one ECU of the plurality of ECUs, the at least one ECU in which the error has occurred is reset, and
   after being reset, the at least one ECU in which the error has occurred respawns an interrupted task according to a performance period of the scheduled task which has been performed in the at least one ECU.

2. The vehicle network system according to claim 1, wherein the at least one ECU updates a last launch time of the scheduled task whenever the scheduled task is performed.

3. The vehicle network system according to claim 2, wherein the at least one ECU respawns the interrupted task at a time of a multiple of the performance period from the last launch time.

4. The vehicle network system according to claim 3, wherein the at least one ECU includes a platform health management (PHM) module, a time synchronization (TS) module, and an execution management (EM) module, and wherein the TS module updates the last launch time of the scheduled task, the PHM module resets the at least one ECU, and the EM module respawns the interrupted task.

5. The vehicle network system according to claim 4, wherein the at least one ECU further includes a watchdog timer which resets the at least one ECU when a watchdog trigger signal is not received from the PHM module, and the PHM module stops transmission of the watchdog trigger signal to reset the at least one ECU.

6. The vehicle network system according to claim 5, wherein the EM module acquires a last launch time ($L_t$) of the interrupted task, acquires a current time (T), and respawns the interrupted task at a time of a multiple of the performance period from the last launch time, using the current time (T), the last launch time ($L_t$), and the performance period ($p_{t\_id}$).

7. The vehicle network system according to claim 6, wherein the EM module determines a minimum value ($k_{min}$) of a natural number k satisfying $T<L_t+k*p_{t\_id}$ and respawns the interrupted task at a time $L_t+k_{min}*p_{t\_id}$.

8. The vehicle network system according to claim 1, wherein the interrupted task to respawn does not affect a task of other ECUs other than the at least one ECU in which the error has occurred.

9. A reset control method in a vehicle network system which includes a plurality of electronic control units (ECUs) configured to perform a scheduled task, the reset control method comprising:
   resetting at least one ECU in which an error occurs when the error occurs in the at least one ECU of the plurality of ECUs; and
   respawning an interrupted task according to a performance period of the scheduled task which has been performed, after resetting, by the at least one ECU in which the error has occurred.

10. The reset control method according to claim 9, wherein the at least one ECU updates a last launch time of the scheduled task whenever the scheduled task is performed.

11. The reset control method according to claim 10, wherein in respawning the interrupted task, the interrupted task is respawned at a time of a multiple of the performance period from the last launch time.

12. The reset control method according to claim 11, wherein the at least one ECU includes a platform health management (PHM) module, a time synchronization (TS) module, and an execution management (EM) module, and wherein
   in updating, the TS module updates the last launch time of the scheduled task,
   in resetting, the PHM module resets the at least one ECU in which the error has occurred, and
   in respawning the interrupted task, the EM module respawns the interrupted task.

13. The reset control method according to claim 12, wherein the at least one ECU further includes a watchdog timer which resets the at least one ECU when a watchdog trigger signal is not received from the PHM module, and
   in resetting, the PHM module stops transmission of the watchdog trigger signal to reset the at least one ECU.

14. The reset control method according to claim 13, wherein respawning the interrupted task includes,
   acquiring a last launch time ($L_t$) of the interrupted task and acquiring a current time (T); and
   respawning the interrupted task at a time of a multiple of the performance period from the last launch time, using the current time (T), the last launch time ($L_t$), and the performance period ($p_{t\_id}$).

15. The reset control method according to claim 14, wherein in respawning the interrupted task, a minimum value ($k_{min}$) of a natural number (k) satisfying $T<L_t+k*p_{t\_id}$ is determined and the interrupted task is respawned at a time $L_t+k_{min}*p_{t\_id}$.

16. The reset control method according to claim 9, wherein the interrupted task to respawn does not affect a task of other ECUs other than the at least one ECU in which the error has occurred.

* * * * *